G. W. HOWELL.
Cut-offs for Cisterns.

No. 142,569.             Patented September 9, 1873.

Attest
John O'Gara
Herrman Merrell

Inventor
George W. Howell
by Wood & Boyd
his Attorneys

UNITED STATES PATENT OFFICE.

GEORGE W. HOWELL, OF COVINGTON, KENTUCKY.

IMPROVEMENT IN CUT-OFFS FOR CISTERNS.

Specification forming part of Letters Patent No. 142,569, dated September 9, 1873; application filed June 19, 1873.

*To all whom it may concern:*

Be it known that I, GEORGE W. HOWELL, of Covington, in the county of Kenton and State of Kentucky, have invented certain new and useful Improvements in Cut-Off in Branch Pipes for Cisterns, of which the following is a specification:

The object of my invention is to provide a cheap and convenient cut-off for branch pipes, with a valve so arranged that the water may be made to flow through either of the two branches by simply turning the valve. It is especially designed for the supply-pipes of cisterns, one branch of which supplies the cistern with water, and the other branch connecting with a drain or gutter.

Figure 1:
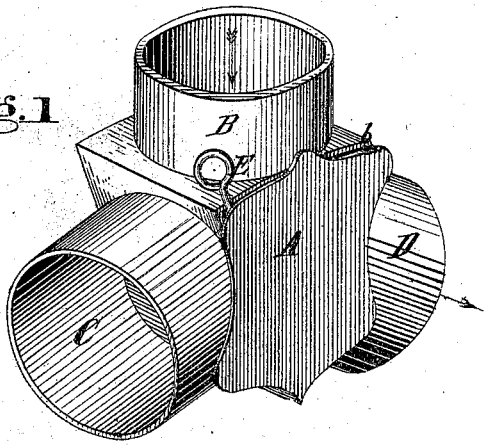
Figure 2:
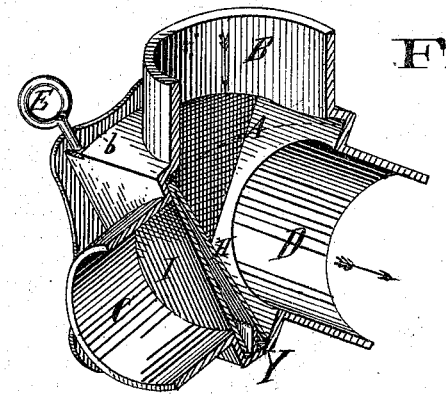
Figure 4:
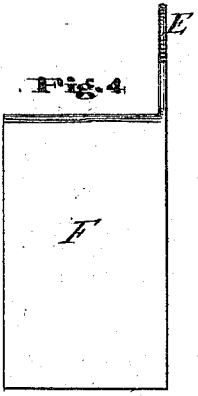
Figure 3:
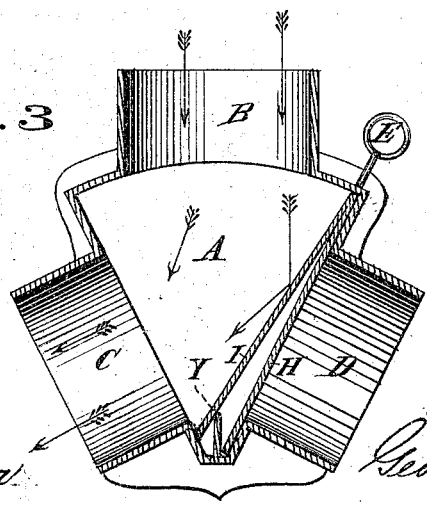

Figure 1 is a perspective view of my improvement; Fig. 2, a sectional perspective of the same; Fig. 3, a vertical section through the center, and Fig. 4 a plan view, of the valve.

A represents the body of the shell or valve-chamber; B, a cylindrical orifice to receive the supply-pipe. C represents a similar pipe-orifice at one side of the valve-chamber; D, a similar pipe upon the opposite side of chamber C. The pipe-openings C and D form branch pipes for communicating upon the one side with the cistern or place to be filled, and the other branch for carrying the water into the gutter or into another vessel. Y represents a ledge or projection in the chamber A. F represents a valve, which corresponds in shape and dimensions to the interior of chamber D. The edges of this valve should loosely fit the sides of the chamber A. The interior of chamber A and the exterior edges of valve F may be of any desired shape or dimension. I H are two pieces of metal joined together to form the valve F. They are open at the bottom to rest upon each side of ledge Y, upon which they turn as the valve is opened or closed, making, practically, a water-tight joint at the bottom of chamber A. Any other kind of joint may be used instead. *b* represents a slot cut in the top of chamber A. E represents a lever or stem, rigidly connected to valve F, and projecting up through slot *b*, as shown in Fig. 1. The faces of valve F may be made of or packed with leather, rubber, or other suitable material for forming a water-joint when the valve rests against either side of chamber to close the pipe-orifices C and D.

The mode of using my device is as follows: The chamber is connected to the supply-pipe at B. A pipe connects C to the cistern or vessel to be filled with water. D communicates with the waste or gutter pipe. Valve F rests upon orifice D and prevents the escape of water in that direction, leaving passage C open for supplying the vessel to be filled. When it is desired to shut off the supply through C, valve F is moved by means of handle E, so that its face is brought against the other side of chamber A, closing orifice C, and allowing the escape of water through D.

Having described my invention, what I claim as new is—

The triangular shell or casing A, having the radiating pipes B C D and slot or opening *b*, as shown, in combination with each other and with the valve F, composed of the plates I H and handle E, and the vertical ledge or rib Y, all constructed and arranged for operation substantially as described.

In testimony whereof I have hereunto set my hand this 14th day of May, 1873.

G. W. HOWELL.

Witnesses:
 EDWARD BOYD,
 ALONZO CAMERON.